Nov. 28, 1939.  C. LE BLEU  2,181,760
SCRAPER
Original Filed May 6, 1935  6 Sheets-Sheet 2

INVENTOR
Charles Le Bleu

Nov. 28, 1939.　　　C. LE BLEU　　　2,181,760
SCRAPER
Original Filed May 6, 1935　　6 Sheets-Sheet 3
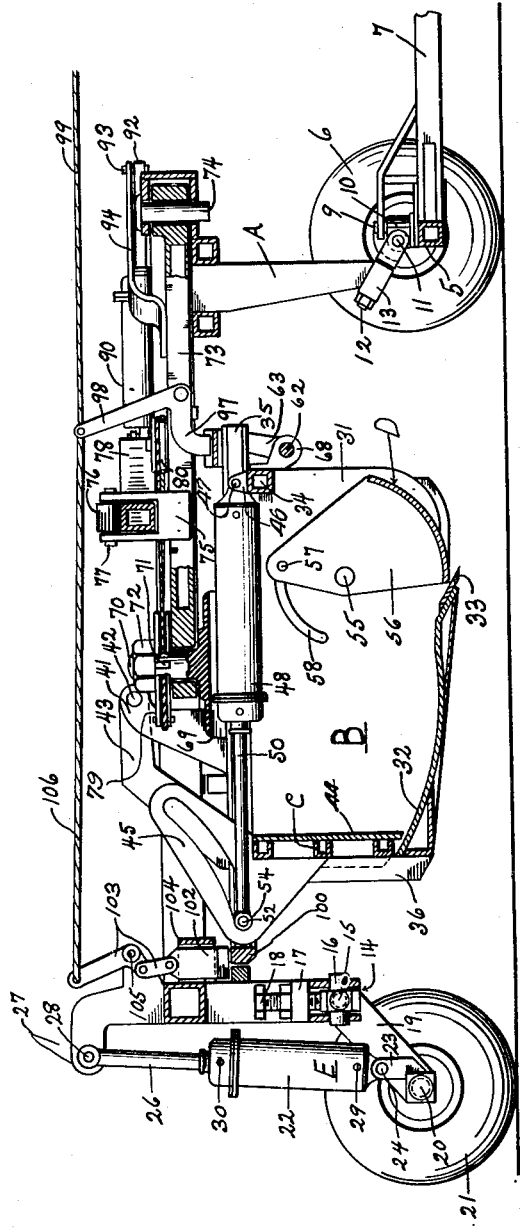
INVENTOR
Charles Le Bleu Nov. 28, 1939.  C. LE BLEU  2,181,760
SCRAPER
Original Filed May 6, 1935   6 Sheets-Sheet 4
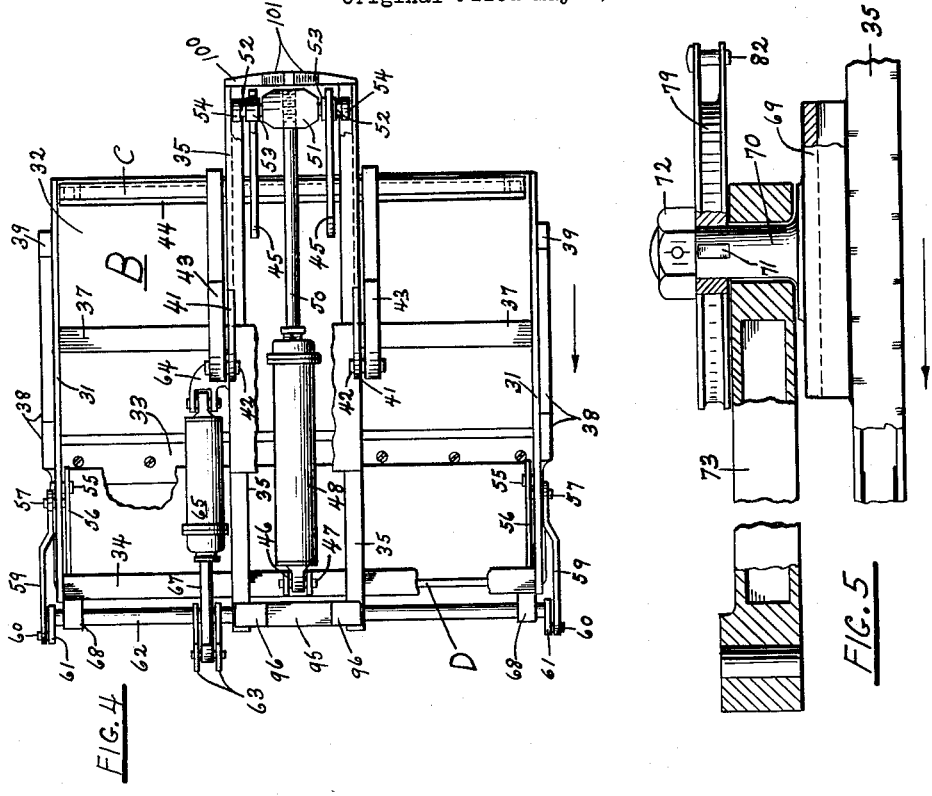
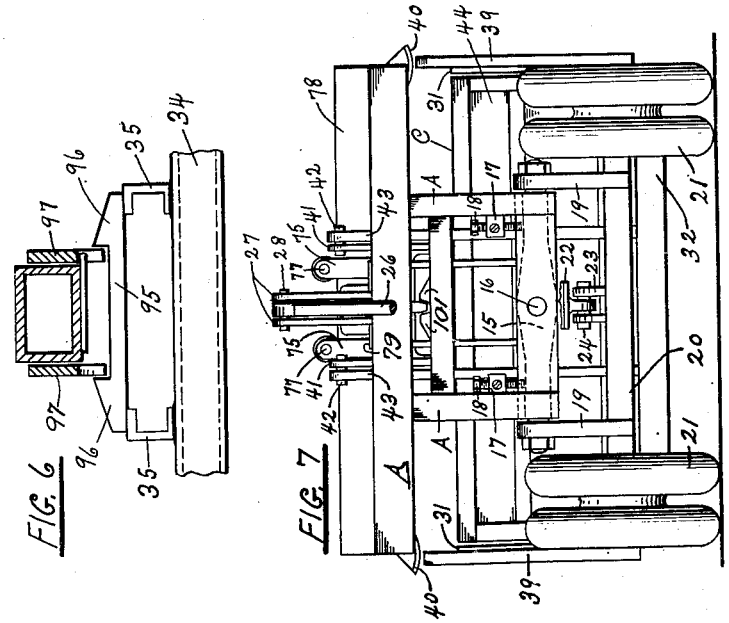
INVENTOR
Charles Le Bleu Nov. 28, 1939.　　　C. LE BLEU　　　2,181,760
SCRAPER
Original Filed May 6, 1935　　　6 Sheets-Sheet 5

INVENTOR
Charles Le Bleu

Nov. 28, 1939.  C. LE BLEU  2,181,760
SCRAPER
Original Filed May 6, 1935  6 Sheets-Sheet 6

INVENTOR
Charles Le Bleu

Patented Nov. 28, 1939

2,181,760

UNITED STATES PATENT OFFICE 2,181,760

SCRAPER

Charles Le Bleu, Los Angeles, Calif.

Application May 6, 1935, Serial No. 19,946
Renewed April 26, 1939

11 Claims. (Cl. 37—126)

This invention relates generally to material digging, scraping, leveling and transporting devices, as used in leveling ground, building roads, excavating, grading, transporting materials etc., and particularly to that type of material moving apparatus known as material moving scrapers by means of which materials are scraped up and transported.

The principal object of the invention is to provide, in a scraping apparatus, adopted to scrape up and load into a material carrying bottom, materials which it is desired to remove and transport elsewhere, means whereby the materials may be discharged from said bottom into the path of the line of travel or to the side thereof.

In the past, and up to the present time, scrapers have been designed to discharge the accumulated load in the path of the line of travel, some discharging the load at the front of the scraper and others at the back end of the scraper. These discharging at the front end cannot deposit the load over an embankment and consequently when such placing of the load is required, it is common practice to dump the materials near the embankment and subsequently push it over the embankment with, say a bulldozer. This is expensive since it requires extra equipment and double handling of the materials. Those discharging the load at the rear end of the scraper may deposit the load over an embankment, but this is also expensive since a great deal of time is lost in turning and backing the scraper into position whereby the materials may be dumped over the embankment, but even so, if the scraper has wheels at the rear end, then even this type is hardly practical since the load would be discharged at the front side of the rear wheels making it difficult, and in some cases impossible, to pull the scraper back onto the roadway, but it is desirable to have the wheels at the rear of the scraper during the loading operation, that is, behind and in the path made by the scraper blade.

More specifically then, it is the object of this invention to provide in a scraper, such (correlation) and construction of parts that the load may be discharged to the side of the scraper, or in the path thereof.

Still another object is the provision in a machine of the character described, of means supporting the bowl on the frame in such a manner that the bowl may be positioned to discharge the load at the side of the machine.

Still another object is the provision in a machine of the class described of a supporting frame, an earth scraping and supporting unit, and means mounting said scraping and supporting unit on said frame for lateral turning movement.

Still another object is the provision in a scraper, of a bowl open at both ends, movable shutters at the open ends of the bowl, and power operated means mounted on the bowl to operate said movable shutters.

Still another object is the provision in a scraper, adopted to discharge the load in the path of the line of travel or to the side thereof, of a frame and bowl structure associated for lateral relative movement and means to cause or prevent said relative movement.

These objects together with other objects and accomplishments pertaining to structure are obtained by the embodiments of my invention illustrated in the accompanying drawings, in which:

Referring to the drawings:

Figure 3 is a side sectional view of Figure 1.

Figure 4 is a plan view of the bowl structure with supporting trunnion and a part of its base removed.

Figure 5 is an enlarged fragmentary side view, partly in section, illustrating the means for supporting the bowl structure.

Figure 6 is an enlarged front view of the stop blocks mounted on the fore part of the bowl structure, and the bowl supporting beam taken on line 2—2 of Figure 2, partly in section, illustrating the means for latching the bowl structure and the bowl supporting beam against relative movement.

Figure 7 is a rear end elevation of the scraper with the hydraulic cylinder partly cut away.

Figure 1:
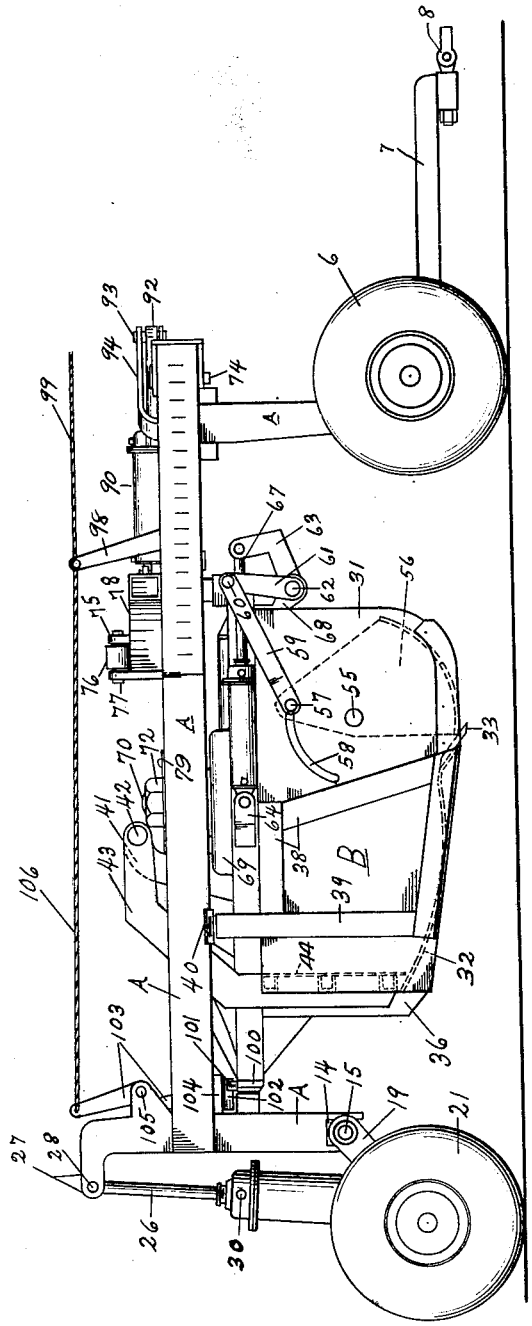
Figure 1 is a side view of the scraper with the parts in load carrying position.
Figure 2:
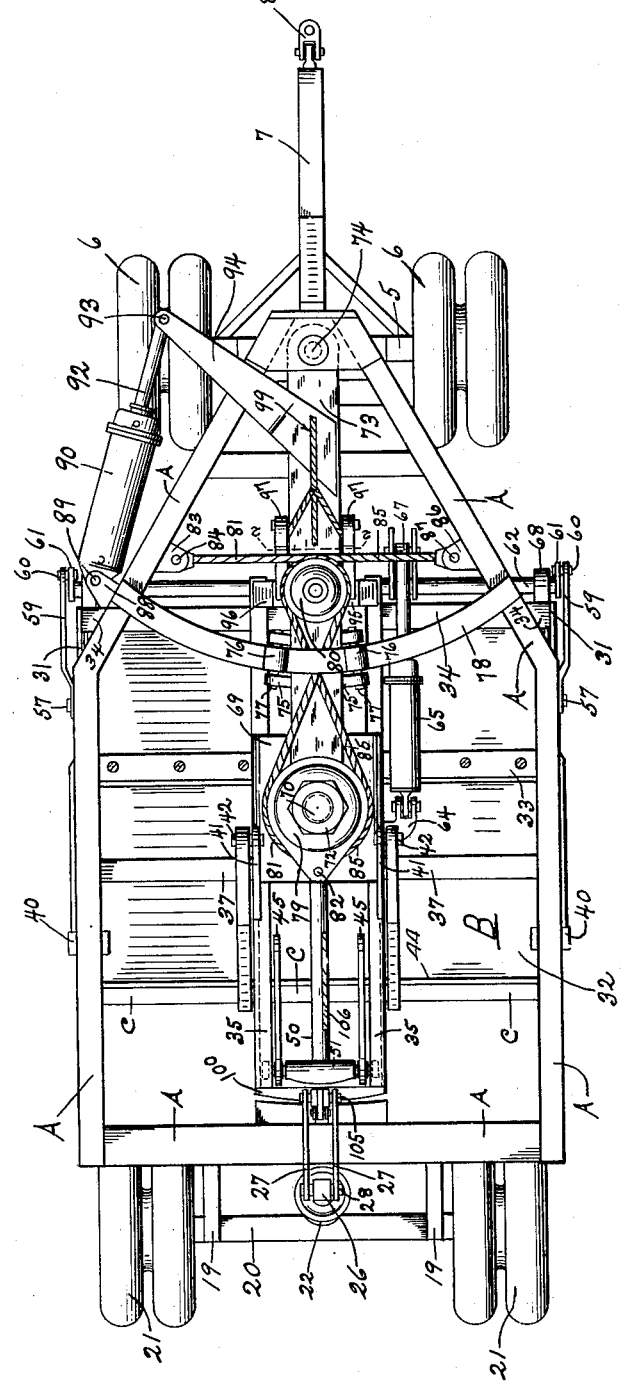
Figure 2 is a plan view of structure shown in Figure 1.
Figure 8:
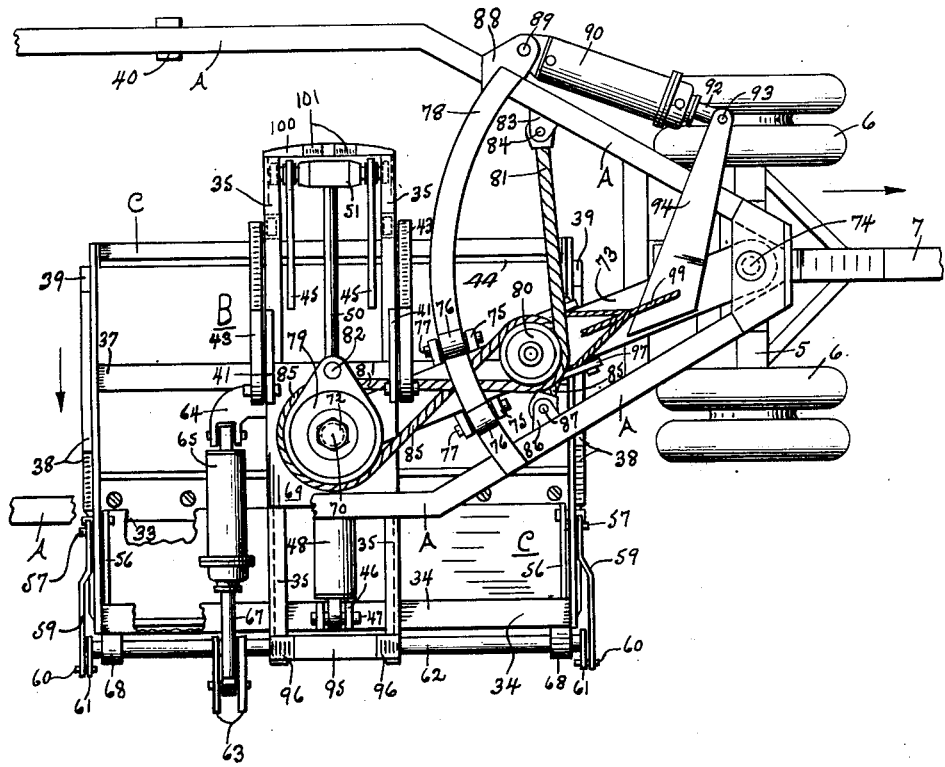
Figure 8 is a fragmentary plan view of the scraper with the bowl in position to dump to the side of the line of travel.

Referring more specifically to the characters of reference on the drawings, Figures 1 to 9 inclusive, a frame A is provided with a front axle 5 having wheels 6 journaled thereon forming a front truck, a draft tongue 7 provides for connection to any suitable draft device, such as a tractor. The draft tongue 7 may be secured to the axle 5 by any suitable means. A swivel and clevis mechanism 8 provides for connecting the tongue to the draft device. Turnably mounted on the axle 5 by means of the king pin 9 extending downwardly therethrough is block 10. Mounted on block 10 by means of pin 11 is a stub shaft 12 extending through bearing block 13 formed on frame A. Formed in the rear end of frame A are slots 14 adapted to receive a rocker shaft 15 pivotally connected to frame A by pin 16. On the inside of frame A at either side of pin 16 spaced therefrom are threaded blocks 17 and adjusting screws 18, which screws contact rocker shaft 15 to adjust the shaft transversely of frame A about pin 16, and to hold said rocker shaft against rocking movement.

Pivotally mounted on each end of rocker shaft 15 are arms 19 secured at their lower ends to rear axle 20 having journaled on each end thereof wheels 21, thus forming the rear trucks to adjustably support the rear end of frame A. A hydraulic cylinder 22 is secured to axle 20 by means of brackets 23 and pin 24. Within the cylinder 22 is a piston 25 on piston rod 26 which is secured to frame A by means of brackets 27 and pin 28. Hydraulic conduit means connected to cylinder 22 at 29 and 30 may lead to any suitable source of hydraulic pressure with convenient valve control whereby fluid under pressure may be directed to one or the other ends of cylinder 22 and cause the piston 25 to be moved to raise or lower the rear end of frame A. The hydraulic cylinder 22, its piston 25 and piston rod 26 constitute a longitudinally expansible strut mechanism which when contracted or expanded causes arms 19 to pivot on rocker shaft 15 and thus raise or lower the rear end of frame A to determine the elevation of the scraping element with respect to the ground.

A bowl structure B, comprises side plates 31 and a bottom plate 32 extending from the rear edge of the side plates to a point short of the front edge of said side plates. At the front edge of the bottom is a scraper blade 33. The bottom 32 is arcuate in shape, the side plates 31 extending forwardly beyond the bottom and overhanging portions thereof and being suitably braced cross-wise. A beam 34 of box form extends crosswise between the forward overhanging portion of side plates 31 at the top thereof. Above the bowl and extending forwardly and rearwardly thereof is a pair of spaced apart channels 35 secured at the forward end of the bowl to beam 34 and secured to the rear end of the bowl by means of a pair of posts or standards 36 rigid with the rear edge of the bottom member at their lower ends and rigid with the channels 35 at their upper ends. Extending from each channel outwardly to side plates 31 is brace beams 37. The side plates may have suitable stiffening members such as 38 and 39 which may be of any suitable shape such as angles or channels. Stiffening member 39 extends upwardly to a position to contact bumper plates 40 formed on frame A when a force is applied to the scraper blade 33 as a result of coming in contact with the ground while advancing to accumulate or spread earth.

Upstanding from the channel members 35 and secured thereto are brackets 41 having journals 42 at their upper ends. Pivotally mounted on journals 42 are arms 43, the journals 42 and arms 43 constitute hinges supporting a gate plate 44 secured to arms and extending between the side plate 31, said hinges being concentric with the arcuate bottom 32. Secured to gate C between channels 35 are slotted plates 45. Secured to beam 34 are brackets 46 supporting one end of a cylinder 48 by means of pin 47. Within cylinder 48 is piston 49. Secured to piston 49 is piston rod 50, the outer end of which is provided with a cross-head 51 having at each end thereof spindles 52 extending through slots in the slotted plates 45 thence into channels 34. Journaled on each of spindles 52 for rolling movement in channels 35 are wheels 54. Thus, it is apparent that gate C may serve as a back wall for bowl B and may be swung to sweep from one end of the bowl to the other.

At the forward end of bowl B journaled on the side plates 31 at 55 in operating relation to the blade 33, are shutter end plates 56 carrying shutter plate D. The upwardly extending portion of end plates 56 are provided with a trunnion pin 57 extending outwardly through slots 58 formed in side plates 31. Pivotally mounted on trunnion pins 57 are connecting bars 59 secured by pivot pins 60 to crank arms 61 rigid with crank shaft 62, secured to crank shaft 62 are crank arms 63. Pivotally supported by a pin carried by a bracket 64, secured to one of the channels 35 is a cylinder 65 provided with a piston 66 and a piston rod 67. A wrist pin secures piston rod 67 to crank arms 63. Thus, upon outstroke movement of the piston rod 67 the shutter D will be swung toward the scraper blade 33 to close the bowl, and upon instroke movement of piston rod 67 shutter D will be swung away from the scraper blade 33 and thus open the bowl. Crank shaft 62 is supported in bearing blocks 68 secured to cross beam 34.

As illustrative of the broad purpose of my invention, that is, of providing in a scraper means whereby the materials, accumulated in the bowl B by the advancing movement of the scraper over the surface of the ground, may be discharged therefrom directly in the path of the line of travel or to the side thereof, I show one specific means of this broad feature.

Rigidly secured to channels 35 is a base 69 having an upwardly projecting stub shaft or trunnion 70 provided with a keyway and key 71 and threaded on the upper end to receive nut 72. Journaled on trunnion shaft 70 is a bowl supporting beam 73 pivotally secured to frame A by means of pivot pin 74. Secured to the bowl supporting beam 73 disposed at each side thereof is a pair of upwardly projecting carriage members 75 carrying at their upper ends rollers 76 and retaining pins 77. Rollers 76 are supported on an arcuate trolley beam 78 which is supported at each end on frame A. Also mounted on trunnion shaft 70 and secured against turning movement thereon by key 71, is a sheave 79, sheave 79 and bowl supporting beam 73 being secured in place by nut 72. Sheave 79 also serves as a thrust washer or bearing. Journaled on the top side of bowl supporting beam 73 intermediate the ends thereof is sheave 80. Cable 81, which is secured to sheave 79 by means of pin 82 passes clockwise about sheave 79 thence counterclockwise about sheave 80 and is secured to frame A by means of brackets 83 and pin 84. A cable 85 which is secured to sheave 79 by pin 82 passes counterclockwise about sheave 79 and thence clockwise about sheave 80 and is secured to frame A by means of brackets 86 and pin 87. Thus it is apparent that beam 73 may swing in a horizontal plane, about pin 74 as a pivot, to position bowl B to either side of its normal position. It is further apparent that any relative movement between the beam 73 and frame A will revolve bowl B, through a horizontal plane, about its pivotal mounting on beam 73, due to the arrangement of cables 81 and 85 heretofore explained. Secured to frame A are brackets 88. Journaled on brackets 88 by means of pin 89 is a cylinder 90 provided with a piston rod 92 secured by pivot pin 93 to an arm 94 rigid with beam 73 to swing said beam 73 in a horizontal plane.

To prevent any accidental relative movement between bowl B and bowl supporting beam 73 and relieve cables 81 and 85 from excessive strains during the loading operation, I provide latch mechanism as follows: Secured to the forward ends of channels 35 is a cross piece 95 having a pair of spaced apart stop blocks 96 formed thereon and having vertical confronting faces, and inclined downwardly on the outer faces, said stop blocks being spaced apart to receive there between a pair of latch bars 97 disposed at either side of and journaled for independent movement on beam 73, said latch bars having upwardly extending arms 98 to which is attached a pull rope 99 extending thence forwardly to the tractor within convenient reach of the operator. Thus latched against relative movement, bowl B and bowl supporting beam 73 comprises a relatively rigid unit.

To prevent relative movement, incidental to the loading operation, between bowl B and from A, I provide a second latch mechanism as follows: Rigidly secured to the rear ends of channels 35 is a cross piece 100 having a pair of stop blocks 101 formed thereon and having vertical confronting faces and inclined downwardly on the outer faces, said stop blocks being spaced apart to receive latch plate 102 slidably supported by link and lever mechanism 103 in a box bracket 104 rigid with frame A. The link and lever mechanism 103 are supported on frame A by brackets 27 and pivot pin 105. Attached to the upper end of lever 103 is pull rope 106 extending thence forwardly to a connection with pull rope 99. Thus the beam 73, bowl B and frame A are latched against relative movement, forming a relatively rigid structure when loading.

In operation, the scraper is drawn across the surface of the ground by any suitable draft means, such as a tractor, whereby a load of earth is accumulated. The scraper blade is then raised from contact with the ground and the front shutter is closed. The load may then be transported to a new location and by operation of various elements of the scraper the load may be discharged in the path of the line of travel or to the side thereof as desired.

Figure 9:
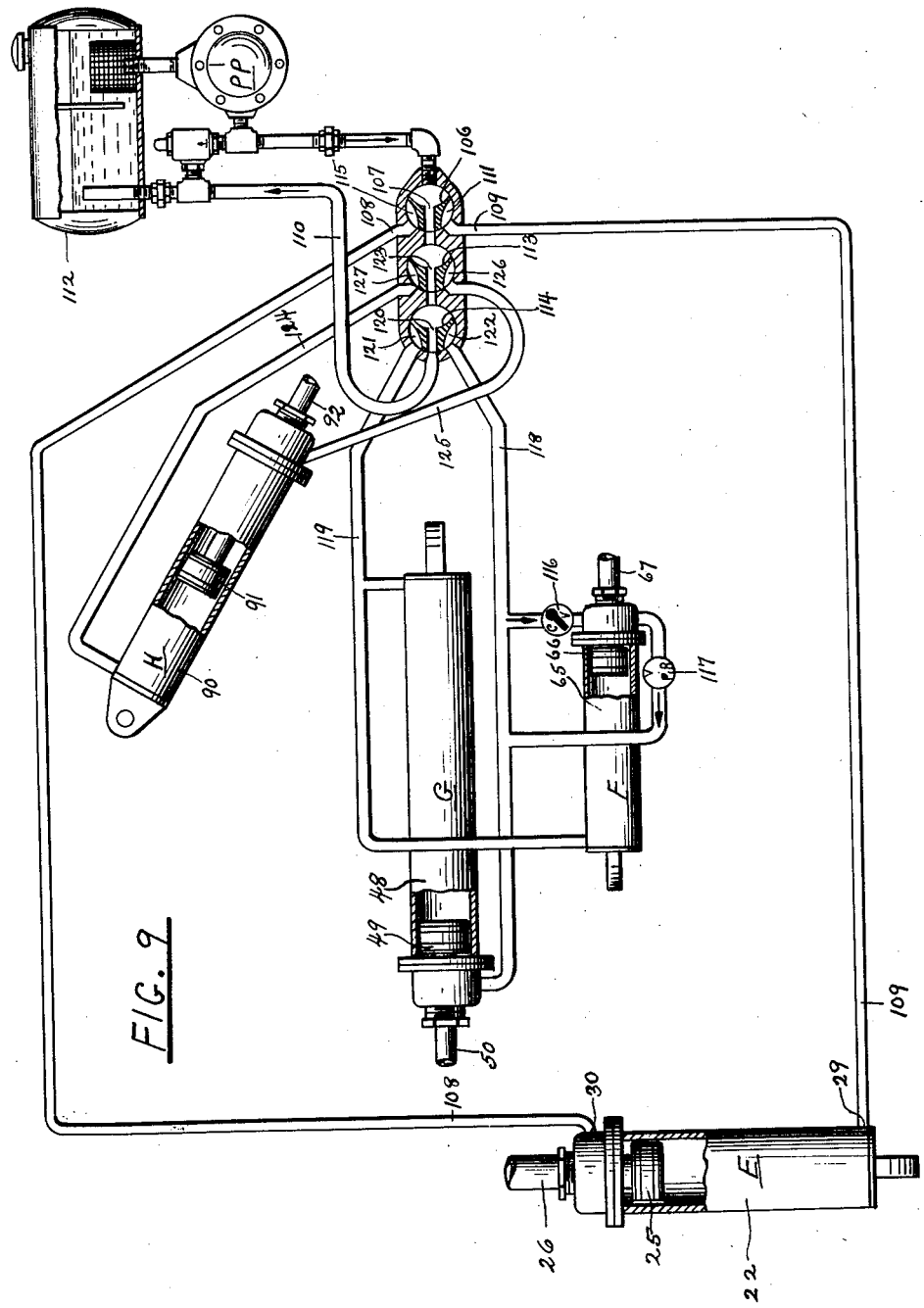
Figure 9 is a diagrammatic view of the hydraulic mechanism used to manipulate the various elements for raising and lowering the bowl, operating the shutter means, and swinging the bowl to position for dumping.

Operably associated with the jacks E, F, G, and H, previously described by means of suitable conduits and control valves, is a continuously running pressure producing mechanism such as a fluid pump PP. The pump receives fluid from a reserve tank and discharges this fluid into a conduit connected to the control valves which are of conventional design having a neutral port or passage and arranged in tandem. With all valves in neutral position as shown in Figure 9, the fluid will flow from the tank to the pump, and from the pump through the control valves back into the tank. Obviously by manipulation of the control valves the fluid may be diverted from its normal flow into the tank to operate the jacks whereby the various elements of the scraper are manipulated.

To determine the elevation of the scraper blade 33 with respect to the ground, valve plug 106 is rotated clockwise to align port 107 with conduit 108 whereby fluid under pressure is directed into cylinder 22 at 30, and conduit 109, connected at the opposite end of cylinder 22 at 29, will be in connection with return conduit 110 by way of side port 111 and the neutral ports in valve plugs 113 and 114. Thus, the fluid under pressure directed into cylinder 22 at 30 will cause piston 25 to move and the fluid displaced from cylinder 22 at 29 incidental to the movement of piston 25, will flow through conduit 109 to side port 111, thence through the neutral ports in valve plugs 113 and 114 into conduit 110 discharging into the reserve tank. Thus the scraper blade 33 is lowered into scraping contact with the ground, and when the desired adjustment is attained valve plug 106 is returned to neutral position thus fluid locking piston 25 against further movement in either direction and forward movement of the scraper across the surface of the ground will result in the accumulation of a charge of materials in bowl B.

When the desired load has been accumulated, valve plug 106 is rotated counter clockwise to align port 107 with conduit 109 whereby fluid under pressure is directed into cylinder 22 at 29, and conduit 108 will be in conection with return conduit 110 by way of side port 115 and the neutral ports of valve plugs 113 and 114. Thus, the fluid under pressure directed into cylinder 22 at 29 will cause piston 25 to move and the fluid displaced from cylinder 22 at 30 incidental to the movement of piston 25, will flow through conduit 108 to side port 115, thence through the neutral ports in valve plugs 113 and 114 into conduit 110 discharging into the reserve tank. Thus the scraper is raised to transporting position, and when the desired adjustment is attained valve plug 106 is returned to neutral position thus fluid locking piston 25 against further movement in either direction.

Jacks F and G are connected to the same conduits and the hydraulic mechanisms are double acting. These are used to manipulate the rear gate C and the front shutter D. Referring to the connections of cylinder 65. At the rod end of cylinder 65 is a conduit having a check valve permitting free ingress of fluid. Another conduit is connected to the rod-end of cylinder 65 and has a spring loaded check valve 117 permitting egress of fluid after a selected hydraulic pressure has been attained. The conduits are connected to a common conduit 118 connected to the rod end of cylinder 48 and associated with valve plug 114. The plugged ends of cylinders 48 and 65 are connected by conduits to a common conduit 119 associated with valve plug 114.

To open the front of the bowl by manipulation of shutter D, and push the load out of bowl B by manipulation of gate C, valve plug 114 is rotated counterclockwise to align port 120 with conduit 118 to direct fluid under pressure into the rod ends of cylinders 48 and 65, and connect conduit 119 with return conduit 110 by means of side port 121 to return to the reserve tank fluid displaced from the plugged ends of cylinders 48 and 65 incidental to the movements of pistons 49 and 66. Thus, since the load applied to the F jack, due to a small load of materials, is less than the load applied to jack G, the front shutter D will first open and then hydraulic pressure will build up to the point necessary to swing gate C forwardly and discharge the load. Hydraulic pressure is then reversed by rotating valve plug 114 clockwise to align port 120 with conduit 119 to direct pressure into the plugged ends of cylinders 48 and 65 and connect conduit 118 with return conduit 110 by means of side port 122. Gate C will thus be swung to the rear of the bowl B before any movement of shutter D occurs due to the action of check valve 116 and spring loaded check valve 117. When gate C has attained its rearmost position valve plug 114 is returned to neutral position, thus fluid locking the gate C in position at the rear of bowl B. The shutter D is now held in open position by spring loaded check valve 117. Jack E may now be operated to lower the scraper blade 33 into scraping position and by forward movement of the scraper dirt will be accumulated in the bowl B, after the desired load has accumulated, further hydraulic pressure is introduced into conduit 119 by operation of valve plug 114 to overcome the action of the spring loaded check valve 117 and close shutter D. Then the jack E is again operated to raise bowl B to transporting position.

The explanation just concluded with reference to the operation of jacks E, F and G remain the same whether the load is to be discharged in the path of the line of travel or to the side thereof. Therefore the following explanation has to do with means and mechanism whereby the accumulated charge of dirt in bowl B may be discharged to the side of the scraper.

To bring bowl B into position to discharge the load at the side of the scraper, rotate valve plug 113 either clockwise or counterclockwise depending upon to which side of the scraper the load is to be discharged. If rotated clockwise aligning port 123 with conduit 124 to direct fluid under pressure into the plugged end of cylinder 90, to move piston 91 outwardly, and connect conduit 125 with return conduit 110 by means of side port 126 and the neutral port 120 in valve plug 114 to return to the reserve tank fluid displaced from the rod end of cylinder 90 incidental to the movement of piston 91, then the bowl B will be positioned to discharge the load at the left side of the scraper and the manipulation of gate C and shutter D to effect discharge of the dirt is as heretofore described. If valve plug 113 is rotated counterclockwise aligning neutral port 123 with conduit 125 to direct fluid under pressure into the rod end of cylinder 90 to cause inward movement of piston 91, and connect conduit 124 with return conduit 110 by means of side port 127 and neutral port 120 in valve plug 114 to return to the reserve tank fluid displaced incidental to the movement of piston 91 inwardly, then the bowl B will be positioned to discharge the load to the right side of the scraper and said discharge is effected through the manipulation of gate C and shutter D. In operation, pull rope 99 is operated to release the bowl and bowl supporting beam structure to permit relative movement therebetween which movement will result from the operation of jack H as above described.

While this specification sets forth the present and preferred construction of the device, still in practice such deviations from such construction may be resorted to as do not form a departure from the spirit of the invention as set forth herein.

What I claim is:

1. A scraper including a main frame, a beam journaled at its forward end on said frame and supporting a scraper bowl for lateral turning movement at its rear end, roller carriage means secured to said beam between the ends thereof, and a transverse trolley beam mounted on the main frame in supporting association with said carriage.

2. A machine of the class described comprising a main frame adapted to be moved across a surface to be treated; a scraper bowl comprising side plates, a bottom plate, a scraper blade secured at the forward end of said bottom plate, an endgate disposed between the side plates and normally positioned at the rear end of the bowl and mounted thereon for movement lengthwise of the bowl, a shutter for the front end of the bowl supported thereon; means pivotally supporting said bowl below said frame for lateral turning movement of the bowl relative thereto; and means to control the elevation of the scraper blade with respect to the surface to be treated.

3. A machine of the class described comprising a main frame adapted to be moved across a surface to be treated; a scraper bowl comprising side plates, a bottom plate, a scraper blade secured at the forward end of said bottom plate, an end gate disposed between the side plates normally positioned at the rear end of the bowl and mounted thereon for movement lengthwise in the bowl, a shutter for the front end of the bowl supported thereon, power operated means mounted on said bowl to manipulate the rear end gate and the shutter; operable means supporting said bowl below said frame for lateral turning movement relative thereto whereby said scraper blade may be positioned either longitudinally at right angle to the line of travel or parallel therewith; means to impart said lateral turning movement; and means to determine the elevation of the scraper blade with respect to the surface upon which the machine is supported.

4. A machine of the class described comprising a main frame adapted to be moved across a surface to be treated; a scraper bowl comprising side plates, a bottom plate, a scraper blade secured at the forward end of said bottom plate, an endgate disposed between the side plates normally positioned at the rear end of the bowl and mounted thereon for movement lengthwise in the bowl, a shutter for the front end of the bowl supported thereon, power operated means mounted on said bowl to manipulate the rear endgate and the shutter; operable means rotatably supporting said bowl below said frame for lateral swinging and turning movement relative thereto whereby said bowl may be positioned to discharge material in the path of travel of the machine or outside said path at the side of the machine; means to impart such lateral movement, and means to determine the elevation of the scraper blade with respect to the surface upon which the machine is supported.

5. A machine of the class described comprising a frame adapted for connection to a tractor, rolling supports for said frame, a scraper bowl comprising side plates, a bottom plate, a scraper secured at the forward end of said bottom plate, an endgate disposed between the side plates normally positioned at the rear end of the bowl and supported thereon and for movement lengthwise therein, a shutter at the front end of the bowl supported thereon, power operated means mounted on the bowl operably associated with said gate and said shutter, means supporting said bowl below said frame for lateral turning movement relative thereto, means to impart such movement, means to releasably secure said frame and said bowl against relative movement, and means to control the operative and inoperative positions of the scraper.

6. A scraper including a frame having rolling supports therefor, a material supporting structure mounted underneath said frame and associated therewith intermediate the rolling supports thereof, and a transverse trolley beam mounted on the main frame and pivotally associated with the material supporting structure, and operable means whereby said structure may be rotated laterally upon its pivotal connection with the trolley beam to provide for the discharge of materials at the side of the scraper, and means to eject said material without tilting said material supporting structure.

7. A scraper including a frame mounted upon rolling supports, a material supporting structure adapted to receive and carry material scraped up by the advancing movement of the scraper, a beam journaled at its forward end on said frame and articulately connected with said material supporting structure at its other end below said frame and intermediate the rolling supports thereof, means for laterally turning said material supporting structure upon its articulate connection with the beam whereby said material supporting structure may be swung to a position at right angles to the movement of the frame, and means for discharging material from the material supporting structure in the path of travel of the frame or to either side thereof.

8. A scraper of the character described comprising a frame adapted to travel over a surface to be treated, a scraper bowl connected with said frame, a blade rigid with the bowl for scraping up material for the bowl, said bowl being adapted to retain the scraped up material until ready for discharge and operable to discharge the material, operable means mounting the bowl below the frame for arcuate lateral swinging movement, means for swinging said bowl, and means to discharge material either in the path of travel or outside the path to one side of the scraper.

9. A scraper of the type described comprising a frame adapted to travel over a surface to be treated, a scraper bowl, a blade rigid with the bowl for scraping up material for the bowl, said bowl being adapted to retain the scraped up material until ready for discharge and operable to discharge the material, operable means mounting the bowl on the frame for arcuate lateral swinging movement, means to laterally swing said bowl, and operable means associated with the scraper, to discharge material either in the path of travel of the scraper or outside the path to the side of the scraper, and means to raise and lower one end of the frame to control the elevation of the scraper with respect to the surface to be treated.

10. A scraper including a main frame, a running gear therefor, a beam journaled at its forward end on said frame and supporting a scraper bowl for lateral turning movement at its rear end, roller carriage means secured to said beam between the ends thereof and a transverse trolley beam mounted on the main frame in supporting relation with said carriage, and hydraulic means associated with the running gear and the main frame whereby the frame and scraper bowl may be raised and lowered with relation to the running gear.

11. A scraper including a frame having rolling supports therefor, a material supporting structure adapted to receive and carry material, a beam journaled at its forward end on said frame and articulately connected with the material supporting structure below said frame and intermediate the rolling support thereof, means for laterally rotating said material supporting structure upon its articulate connection with said beam whereby said material supporting structure may be rotated to a position transversely of said frame and means associated with the material supporting structure to eject material without tilting said material supporting structure either in the path of travel of said device or at either side thereof.

CHARLES LE BLEU.